Oct. 21, 1969  D. D. LANZ ET AL  3,473,582

ARTICULATED ASSEMBLY FOR A CHAIN

Filed April 17, 1967

DONALD D. LANZ
ROY E. WILSON
INVENTORS.

BY

BUCKHORN, BLORE, KLARQUIST & SPARKMAN
ATTORNEYS

United States Patent Office 3,473,582
Patented Oct. 21, 1969

3,473,582
ARTICULATED ASSEMBLY FOR A CHAIN
Donald Duane Lanz, Oregon City, and Roy Edward Wilson, Molalla, Oreg., assignors to Omark Industries, Inc., Portland, Oreg., a corporation of Oregon
Filed Apr. 17, 1967, Ser. No. 631,338
Int. Cl. B27b 33/14; F16g 13/02
U.S. Cl. 143—135                                     16 Claims

ABSTRACT OF THE DISCLOSURE

A saw chain includes alternate center links and side links wherein the side links are provided with tabs extending into matching center link apertures. Tabs on opposite side links are aligned and extend into a given center link aperature from opposite planar directions so that the forward or depressed portion of each tab extends toward a root portion of the opposite tab. Each tab is welded within the aperature to the tab extending from the opposite side link whereby to provide a chain pivot means.

BACKGROUND OF THE INVENTION

Saw chain for use in motor driven saws usually comprises a series of alternate side and center links pivotally joined by means of rivets extending through the links. Twice as many side links as center links are employed, with each center link being pivoted between a pair of side links. Chains of this type are illustrated, for example, in Cox Patent 2,508,784 and Merz Patent 2,589,015. In order for articulation between the chain links to establish free rotation therebetween, means are provided relative to the rivet to prevent binding between side and center links. A bearing portion in the form of a spacer for the side links is conventionally positioned within an aperture in the center link against which the side links are secured and around which the center link may turn. Such a spacer may form a part of the side link or may form a part of the rivet. In any case, the rivet extends through the spacer for joining the respective links. As may be appreciated, this manner of joining the chain consumes a number of elements in addition to the links themselves and a somewhat exacting construction is required.

SUMMARY OF THE INVENTION

According to the present invention, a pair of side links of a chain are rotatably joined to a center link by means of aligned tongue-shaped tabs which are depressed into an aperture in the center link to provide a freely rotating articulated assembly. Each tab is partially severed from its respective side link and is bent into the aperture from a root portion where the tab joins such side link. The forward or severed portions of the tabs extending from opposite side links are oriented in opposite planar directions, and the tabs are welded together within the aperture along a mutual extended surface therebetween. The welded tabs provide a pivot around which the center link may freely turn.

The articulated assembly according to the present invention may be readily manufactured by first stamping the side links with the aforementioned tab configuration, after which the chain is assembled by spot welding the tabs together. No additional parts such as spacers or rivets are required, and assembly thereof is simpler.

It is accordingly an object of the present invention to provide a more economical saw chain.

It is another object of the present invention to provide an improved chain articulation assembly which does not employ rivets, pins, or spacer means.

It is another object of the present invention to provide an improved articulation chain which may be simply produced employing a minimum number of parts and a minimum number of manufacturing operations.

DRAWINGS

Figure 1:
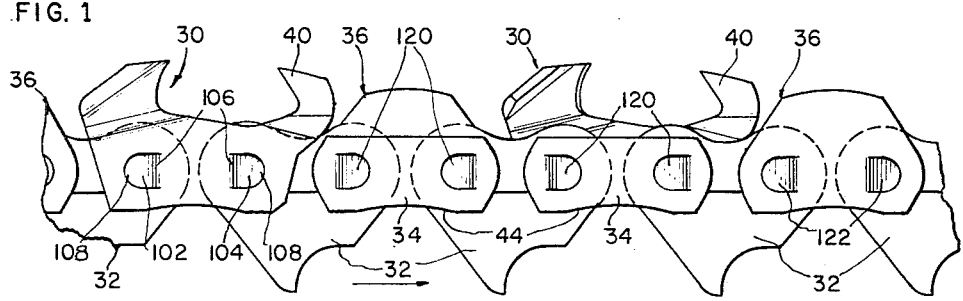
Figure 2:
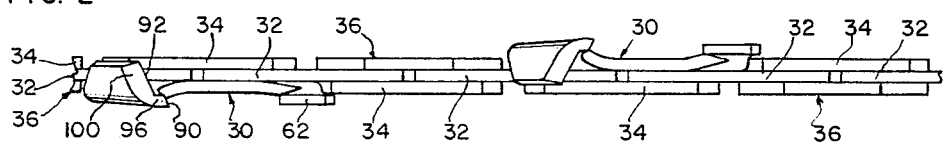
Figure 3:
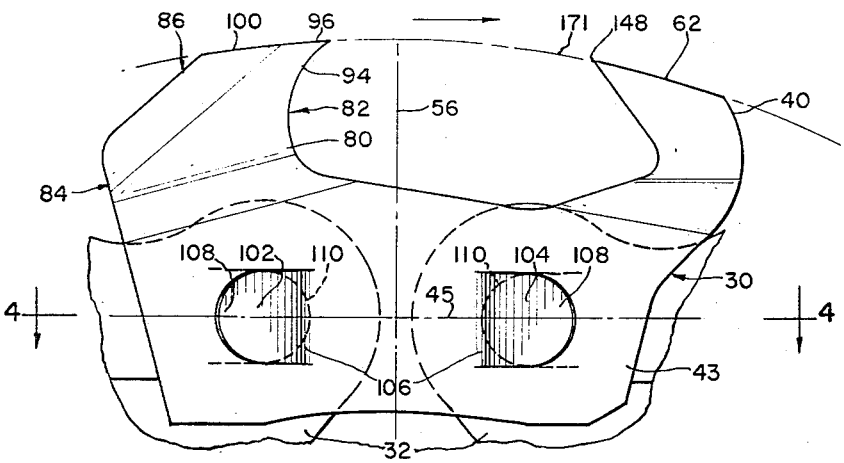
Figure 4:
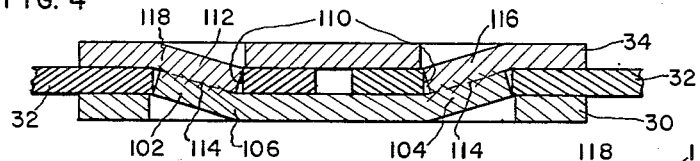
Figure 5:
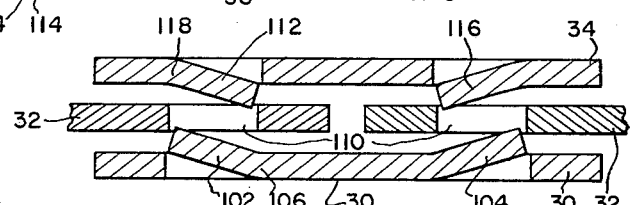
Figure 6:
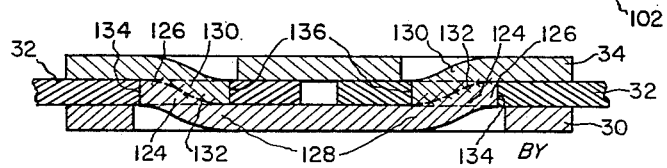

FIG. 1 is a side view of a saw chain constructed in accordance with the present invention, FIG. 2 is a top view of the FIG. 1 saw chain, FIG. 3 is a detailed side view of a side cutter link assembly from the FIG. 1 saw chain, FIG. 4 is a cross section taken at 4—4 in FIG. 3, FIG. 5 is an exploded view in cross section of the FIG. 3 assembly, and FIG. 6 is a cross section of an alternative type of link assembly constructed in accordanue with the present invention.

DETAILED DESCRIPTION

The present invention particularly relates to a freely rotating articulated assembly for a saw chain or the like. A saw chain in which this assembly is employed will first be described, such saw chain being of the general type se forth and claimed in the copending application of Kay Silvon, Serial No. 588,429, filed Oct. 21, 1966, and assigned to the assignee of the present invention, as well as in Silvon patent 3,263,727, also assigned to the assignee of the present invention.

Referring to FIG. 1, a saw chain includes allochiral side cutter links 30, mounted alternately on opposite sides of the chain. A side guard link 36 is mounted directly behind and on the same side of the chain as each side cutter link, and each side cutter link as well as each side guard link is mounted opposite a side tie link 34. As viewed from one side, the chain repeats the pattern of a side guard link, a side cutter link. and a pair of side tie links serially attached in that order by means of intervening sprocket engageable center drive links 32. Each center link is joined to the next center link by a pair of the side links extending therebetween and on either side thereof partially adjoining the side surfaces of the center link. Each link is suitably initially formed of flat sheet metal material, e.g. in a stamping operation.

Each cutter link includes a forwardly located depth gauge 40, the purpose of which is to predetermine the depth of cut that will be taken by the cutter link. The depth gauge is kept clear of small twigs and the like in brush cutting operations by the guard link 36. Each cutter link 30 is a one-piece member and includes, in addition to a flat or planar body 43 and a depth gauge 40, an offsetting shank 80 joining the upper or outer portions of the body to a side plate 82. A bent or rounded narrow junction 84 joins a rearwardly and inwardly sloping top plate 86 to the outer, rearward edge portion of the side plate. The side plate 82, the junction portion 84, and the top plate 86 define a cutter tooth having top sharpenable stepped or offset curved bottom cutting edges 90 and 92 and a curved slide slitting edge 94.

The cutting edges of 90 and 92 may be sharpened and the depth gauge 40 reduced in height by top sharpening, suitably effected by grinding. In the top sharpening operation an abrasive member may be brought into engagement with the surfaces 62, 96 and 100 as the cutter link 30 is advanced along a curved path such as, for example, a drive sprocket or nose roller of a chain saw (not shown). The surface 62 and the surfaces 96 and 100 will be arcuate, that is, these surfaces will form parts of an imaginary cylinder 171 if sharpening is accomplished by grinding in this manner.

The tip 148 of the depth gauge, which is the highest and most rearward point of the surface 62, is positioned substantially farther forwardly of center line 56 (a line which would pass through the center of a drive sprocket around which the link may be driven) than the greatest distance rearwardly of any part of the cutting edges 90 and 92. Tip 148 of the depth gauge is therefore lower than the cutting edges 90 and 92. The shape of the depth gauge is such relative to the cutter tooth that the proper height differential will be maintained throughout the life of the saw chain by top sharpening.

In accordance with the present invention, instead of employing pins or rivets between the respective side links and center links, the side links themselves are constructed to provide their own pivot means. Referring, for example, to FIG. 3 a side cutter link is provided with a pair of tongue-shaped tabs 102 and 104 which are partially severed from the side link during manufacturing, e.g. as a part of a stamping operation, with each tab being displaced from the plane of the side link except at least at the root cross section 106 at which point the tab remains joined to the side link. A forward severed portion 108 of each tab is preferably semicircular in outline, while the severed side edges of the tab toward the rearward or unsevered root portion are substantially straight and parallel with a longitudinal center line 45 of the tab. It is understood the other side links as well as the side cutter links are also provided with tabs.

The articulated assembly according to the present invention will be most clearly understood from the cross section of FIG. 5. Each center link 32 is provided at each end thereof with an aperture 110 in the form of a circular cylindrical bore extending perpendicularly to flat parallel sides of the center link. The side links 30 and 34 are preferably approximately equal in thickness to the center links or slightly thicker than the center links, and are substantially flat where they abut the side surfaces of the center links. Both tabs 102 and 104 are depressed within the apertures 110 and are joined therewithin to similar tabs 112 and 116 extending from opposite side link 34. In the embodiment illustrated in FIGS. 3, 4 and 5, tabs extending from each side, e.g. tabs 102 and 112, are depressed inwardly from their root portion at substantially equal angles with respect to the side links whereby to form a straight interface 114 therebetween.

In assembly, the tabs are first properly aligned, e.g. employing a jig for holding the respective links, and the tabs are suitably welded, e.g. spot welded, together at the interface. An insulating coating may be applied between the center link 32 and the side links 30 and 34 except between the tabs, so that welding will take place only between the tabs. A rigid connection is thereby established between side links 30 and 34, with the tabs providing a pin bearing means within the apertures 110 around which center link 32 may rotate. The assembly is simple and requires no parts in addition to the links themselves.

The tabs are positioned in alignment prior to and after welding such that the semicircular forward edge of each tab substantially matches the adjacent inner bore of the aperture 110. The positioning is such that the semicircular forward edge of each tab constitutes substantially half of a circular pivot matching the aperture 110. To be more precise, a total circular pivot diameter slightly less than that of aperture 110 is provided, within given tolerances, such that rotation may take place. While substantially circular front edges of the tabs are suitable, a more accurate match between these tabs and the apertures 110 can be provided with forward edges of the tabs arranged to be slightly elliptical, wherein the major axis extends longitudinally of the tab. The projection of the ellipse in the plane of center links 32 should be circular.

In the illustrated embodiment, wherein the thickness of each side link is approximately equal to or slightly greater than the thickness of the center link, the tip end of each tab is displaced by a distance approximately equal to the thickness of the side link. In some instances, in order to prevent binding, this displacement may be slightly greater than the thickness of the side link. However, should the thickness of the center link be less than the thickness of each side link, then the displacement of the tab may be slightly less than the thickness of the side link.

In the present embodiment the tabs are suitably aligned longitudinally of the side links and longitudinally of the chain. However, the tabs joined within a given aperture proceed in opposite directions from their root portions, that is, the tabs proceed into an aperture from opposite circumferential edges of the aperture. Thus, tab 102 is depressed inwardly from root portion 106 so its forward or tip end is substantially opposite root portion 118 of the tab 112. Similarly, the tab 112 proceeds from root portion 118 inwardly so that its tip portion is substantially opposite root portion 106 of tab 102. However, the longitudinal axes of the two tabs are nearly the same and the bending axes at the root portions are substantially parallel whereby the tabs angularly abut one another to provide a continuous flat interface suitable for welding.

In order to manufacture the chain according to the present invention with the least number of separate operations, each of the side tie links 34 are formed with the tabs thereof oriented in the same direction with respect to the center of the tie link. Thus, in the embodiment illustrated in FIG. 1, tabs 120, as viewed from the side, have semicircular forward portions directed toward each other. Since these side tie links are welded opposite not only side cutter links, but also opposite side guard links, the tabs on both the cutter links and guard links will have semicircular forward portions oriented outwardly from the link centers or away from one another. Tabs 102 and 104 on each side cutter link 30, as well as tabs 122 on side guard links 36 will thus be directed away from one another. This construction obviates the manufacture of more than one kind of side tie link 34. It is of course understood that the orientation of all the respective tabs may be reversed from the illustrated example, while still retaining the same advantage.

A second embodiment of the present invention is illustrated in FIG. 6. A longitudinal cross section of an articulation assembly is illustrated having substantially the same elements referred to by the same reference numerals. The principal difference is the shape of the depressed tabs which join side links 30 and 34 within the apertures in the center links 32. In this embodiment tabs 124 of side link 30 are doubly bent within the apertures in center links 32 so that the forward end 126 of the tab towards its forward tip is substantially parallel to the surface of side link 30. The tab at its root cross section 128 is similarly substantially parallel to the surface of side link 30, and therefore the tab takes on a doubly bent or S-shaped configuration in longitudinal cross section. Similarly, matching tabs 130 are formed to have a matching shape so as to provide a smooth matching interface 132 therebetween where the tabs may be welded together.

As in the previous embodiment, the apparatus in center links 32 are substantially cylindrical and the forward ends of the tabs are substantially semicircular in forward outline. However, since the tabs are doubly bent, tabs 124 present a forward tip 134 having a semicircular edge substantially parallel with and more fully bearing upon the inner bore of the aperture. Similarly, the forward tip 136 of each tab 130 will have a semicircular edge substantially parallel with and bearing upon an inner bore of an aperture. Thus, a pivot bearing surface of increased longitudinal extent is provided within these apertures.

According to the FIG. 6 embodiment, the tabs are also positioned prior to welding with the semicircular forward portion of the respective tabs, e.g. tabs 124 and 126 aligned so that when taken together, the two tabs form a substantially circular pivot within the aperture. Construction and alignment of the side links is such that the circular pivot within the aperture is achieved despite the tab foreshortening caused by double bending thereof. Thus, tabs 124 and 130, for example, have a longer curved interface 132 and the tabs are accordingly bent and aligned from their side links to provide an additional degree of overlap.

We claim:

1. An articulated assembly comprising,
a center member and spaced side members of sheet metal wherein said center extends into the spacing between said side members,
said center member having an aperture extending therethrough in a direction between said side members,
each side member having a tongue-like tab extending angularly out of the plane of said side member toward the opposite side member except for at least at a root cross section of said tab where said tab substantially joins the plane of the side member,
each tab being aligned with said aperture and rigidly secured to the tab on the opposite side member within said aperture to provide a pivot around which said center member is rotatable,
each of said tabs extending oppositely to and being laterally offset from the tab to which it is secured.

2. An articulated assembly comprising,
a center member and spaced side members wherein said center member extends into the spacing between said side members,
said center member having a cylindrical aperture extending therethrough in a direction between said side members,
each side member having a tab substantially severed therefrom and depressed therefrom towards the opposite side member except for at least a cross section thereof where said tab is unsevered from the side member,
the periphery of each tab being substantially U-shaped and extending at an acute angle to the plane of the side member thereof,
each tab being aligned with said aperture and rigidly secured to the tab on the opposite side member to provide a pivot around which said center member is rotatable,
the forward depressed portion of each tab having a substantially semicircular forward periphery for rotatably engaging the cylindrical walls of said aperture.

3. The assembly according to claim 2 wherein said tabs are welded together within said aperture.

4. The assembly according to claim 2 wherein said tabs are aligned and the forward depressed portion of each tab extends within said aperture along the opposite tab towards a portion of such opposite tab where the latter joins its side member.

5. In a saw chain including a center link having flat side surfaces and an aperture therebetween, and a pair of parallel side links having flat surfaces adjacent either side surface of the center link,
a tongue-shaped tab provided on each of said side links wherein such tongue-shaped tab is severed from its side link and displaced from the plane thereof except at least at a root cross section where said tab joins its respective side link,
each of said tabs being depressed inwardly within said aperture, extending at an acute angle to the body of the side link of which it is a part, and being joined to the tab of the other side member to provide a bearing surface within said aperature for rotation between said side links and said center link.

6. The device according to claim 5 wherein said tabs are welded together within said aperture.

7. The device according to claim 5 wherein the forward depressed portions of said tongue-shaped tabs are substantially semicircular at their forward ends.

8. The device according to claim 7 wherein said aperture in said center link is substantially circular in cross section and substantially matches the semicircular portion of each tab where the latter is depressed into the aperture for relative rotation therebetween.

9. The device according to claim 5 wherein the tongue-shaped tabs on opposite side links are aligned but oppositely directed so that a forward displaced portion of each tab adjoints the other tab towards its root portion.

10. The device according to claim 5 wherein said tabs are each substantially flat and each extends into said aperture at substantially the same angle with respect to the flat surfaces of said side links to form the flat interface between said tabs within said aperture.

11. The device according to claim 5 wherein the said aperture is cylindrical,
wherein the forward depressed portion of each tongue-shaped tab is substantially semicircular,
and wherein each of said tongue-shaped tabs is doubly bent between the root cross section thereof and the forward tab end thereof so that said tab towards its forward tip is substantially parallel to the surface of its side link, the forward tip portion of said tab having a semicircular edge substantially parallel with and bearing upon the inner bore of said aperture.

12. The device according to claim 5 wherein the thickness of said center link approximates the thickness of each of said side links, the displaced forward tip of each said tab being depressed within said aperture the distance of approximately its own thickness.

13. A saw chain comprising,
a series of center links each joined to the next by a pair of side links of sheet metal having substantially planar bodies extending therebetween and on either side thereof partially adjoining the side surfaces of the center links,
each of said center links being provided with an aperture at either end thereof between a pair of the side links,
each of said side links having tongue-shaped tabs extending at acute angles out of the plane of the body of said body into said apertures in said center links from the roots of said tabs where said tabs are joined to said side links, with the tabs on opposite side links extending into said aperture from opposite sides of the circumference of said aperture and laterally abutting one another,
said tabs being joined within said aperture to provide a pivot between said side links and said center links,
at least ones of said side links including cutter means and at least ones of said center links comprising drive links.

14. The saw chain according to claim 13 wherein said tabs extend substantially in a direction longitudinal to said saw chain.

15. The saw chain according to claim 14 wherein said tabs on all cutter side links have forward depressed portions extending longitudinally in a first sense with respect to the center of such cutter side links, while tabs on all opposite side links opposing said cutter links extend longitudinally in an opposite sense with respect to the center of such opposite side links.

16. The saw chain according to claim 15 further including guide side links having tabs extending in the same sense as the tabs on the cutter side links,
    said chain when viewed from one side having a repetitive pattern including guard side links, cutter side links, and a pair of opposite side links serially attached together in that order with intervening center links,
said pair of opposite side links opposing other guard side links and cutter side links, with all said opposite side links having tabs extending in the same sense with respect to the centers thereof.

References Cited

UNITED STATES PATENTS

| | | | |
|---|---|---|---|
| Re. 24,475 | 5/1958 | Siverson | 74—252 |
| 958,676 | 5/1910 | Dodge. | |
| 3,228,437 | 1/1966 | Wezel | 143—135 |

FOREIGN PATENTS

| | | |
|---|---|---|
| 814,787 | 9/1951 | Germany. |

DONALD R. SCHRAN, Primary Examiner

U.S. Cl. X.R.

74—252

PO-1050
(5/69)

UNITED STATES PATENT OFFICE
CERTIFICATE OF CORRECTION

Patent No. 3,473,582      Dated October 21, 1969

Inventor(s) Donald Duane Lanz et al

It is certified that error appears in the above-identified patent and that said Letters Patent are hereby corrected as shown below:

Column 1, line 63, delete "spot" (page 2, line 19 of specification, canceled by preliminary amendment dated April 14, 1967);

Column 2, line 29, change "se" to -- set -- Page 3, line 18 of specification);

Column 4, line 70, change "apparatus" to -- apertures -- (page 9, line 6 of specification).

SIGNED AND
SEALED
MAY 19 1970

(SEAL)
Attest:

Edward M. Fletcher, Jr.
Attesting Officer

WILLIAM E. SCHUYLER, JR.
Commissioner of Patents